(12) United States Patent
Westphal et al.

(10) Patent No.: US 8,924,420 B2
(45) Date of Patent: *Dec. 30, 2014

(54) CREATING LOGIC USING PRE-BUILT CONTROLS

(75) Inventors: Kerry Westphal, Seattle, WA (US); James Rivera, Bellevue, WA (US); Christopher Deugau, Issaquah, WA (US); Ryan McMinn, Seattle, WA (US); Robert Coggins, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 154 days.

This patent is subject to a terminal disclaimer.

(21) Appl. No.: 13/172,705

(22) Filed: Jun. 29, 2011

(65) Prior Publication Data
US 2013/0007071 A1    Jan. 3, 2013

(51) Int. Cl.
*G06F 7/00* (2006.01)
*G06F 17/00* (2006.01)
*G06F 17/30* (2006.01)
*G06F 9/44* (2006.01)

(52) U.S. Cl.
CPC ...................................... *G06F 8/34* (2013.01)
USPC ........................... 707/790; 707/779; 707/804

(58) Field of Classification Search
CPC .............. G06F 17/30985; G06F 17/30; G06F 17/30595
USPC .......... 707/769, 899; 715/738, 786, 841, 866; 345/826
See application file for complete search history.

(56) References Cited

U.S. PATENT DOCUMENTS

| | | | |
|---|---|---|---|
| 5,815,149 A | 9/1998 | Mutschler, III et al. | |
| 6,179,487 B1 * | 1/2001 | Bardon et al. | 715/841 |
| 7,039,699 B1 * | 5/2006 | Narin et al. | 709/224 |
| 7,415,010 B1 | 8/2008 | Croak et al. | |
| 7,934,149 B1 | 4/2011 | Raje | |
| 8,132,127 B2 * | 3/2012 | Baier et al. | 715/866 |
| 2002/0054155 A1 * | 5/2002 | Churchill et al. | 345/826 |
| 2004/0056896 A1 | 3/2004 | Doblmayr et al. | |
| 2005/0066287 A1 | 3/2005 | Tattrie et al. | |

(Continued)

OTHER PUBLICATIONS

"What's new in Microsoft InfoPath 2010", Retrieved at <<http://office.microsoft.com/en-us/infopath-help/what-s-new-in-microsoft-infopath-2010-HA010358944.aspx>>, Retrieved Date: Mar. 24, 2011, pp. 3.

(Continued)

*Primary Examiner* — Susan Chen
(74) *Attorney, Agent, or Firm* — Damon Rieth; Jim Ross; Micky Minhas

(57) ABSTRACT

A gallery-set of controls and actions containing pre-built logic is provided for building applications, projects and solutions in a database program. The gallery may include the most commonly used controls that may account for the main logic scenarios in the database program. The controls may be simple, clear and intuitive, such that users with little or no programming experience may be able to develop solutions in the database program using the gallery controls without having to enter any coding environment or having to build complicated logic expressions. The gallery may allow users to build a complete solution by adding the predefined controls from the gallery to the design surface of a solution without opening a code editor, and the code behind the control may be automatically built into the solution. The solution code may also be accessible for later modification by a user in the database program.

19 Claims, 6 Drawing Sheets

(56) References Cited

U.S. PATENT DOCUMENTS

| | | | |
|---|---|---|---|
| 2006/0117271 A1* | 6/2006 | Keim | 715/789 |
| 2009/0319924 A1 | 12/2009 | Slone et al. | |
| 2010/0070945 A1 | 3/2010 | Tatterie et al. | |
| 2010/0299347 A1* | 11/2010 | Greenberg et al. | 707/769 |
| 2011/0289419 A1* | 11/2011 | Yu et al. | 715/738 |

OTHER PUBLICATIONS

"Introduction to ASP.Net 2.0 Features", Retrieved at <<http://www.sourceasp.net/post3/Introduction-to-ASP-Net-2-0-Features.aspx>>, Retrieved Date: Mar. 25, 2011, pp. 2.

Chan, Ray., "A Closer Look at XPages in IBM Lotus Domino Designer 8.5", Retrieved at <<http://www-07.ibm.com/hk/e-business/events/archives/downloads/XPage—overview.pdf>>, Retrieved Date: Mar. 24, 2011, pp. 28.

"Introducing BEA WebLogic Integration", Retrieved at <<http://download.oracle.com/docs/cd/E13214_01/wli/docs92/overview/1intro.html>>, Retrieved Date: Mar. 24, 2011, pp. 33.

"Microsoft Content Management Server 2002 Evaluation Guide", Retrieved at <<http://msdn.microsoft.com/en-us/library/ms964274.aspx>>, Jun. 2003, pp. 38.

"Ektron CMS400.Net Version 6.0", Retrieved at <<http://dev.ektron.com/articles.aspx?id=5063>>, Apr. 18, 2006, pp. 2.

"International Search Report", Mailed Date: Nov. 30, 2012, Application No. PCT/US2012/038741, Filed Date: May 19, 2012, pp. 10.

* cited by examiner

CREATING LOGIC USING PRE-BUILT CONTROLS

BACKGROUND

Database programs may be used for building solutions and applications that manage varying types and amounts of data. Some examples solutions that may be developed in a database program may include tables for storing custom data, forms for providing user friendly data entry and efficient interaction with the database, queries for filtering data, summarizing data, and automating data management tasks, and reports for formatting summarizing and presenting data. Some database programs may provide templates for building simple solutions, and for building more complex solutions, macros and program development applications or code editors may be provided.

Typically building a database or a solution in a database program requires some coding knowledge or experience. Complex solutions for adding controls, forms, tables and reports may be generated using code editors in separate program development applications or using macros within the database program and may limit the users who are able to develop solutions using the database program. Database programs are useful to many users and as the user base grows, users may be limited in their ability to develop solutions in a database program when the user has little or no programming experience, as the user may not be able to code the complex components of a solution.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing a gallery set of controls and actions containing pre-built logic for building applications, projects and solutions in a database program. The gallery may include the commonly used controls that may account for the main logic scenarios in the database program. The controls may be simple, clear and intuitive, such that users with little or no programming experience may be able to develop solutions in the database program using the gallery controls without having to enter any coding environment or having to build complicated logic expressions. The gallery may allow users to build a complete solution by adding the predefined controls from the gallery to the design surface of a solution without opening a code editor, and the code behind the control may be automatically built into the solution. The solution code may also be accessible for later modification by a user in the database program. The gallery may also allow users to add their own custom defined controls for easy reuse.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
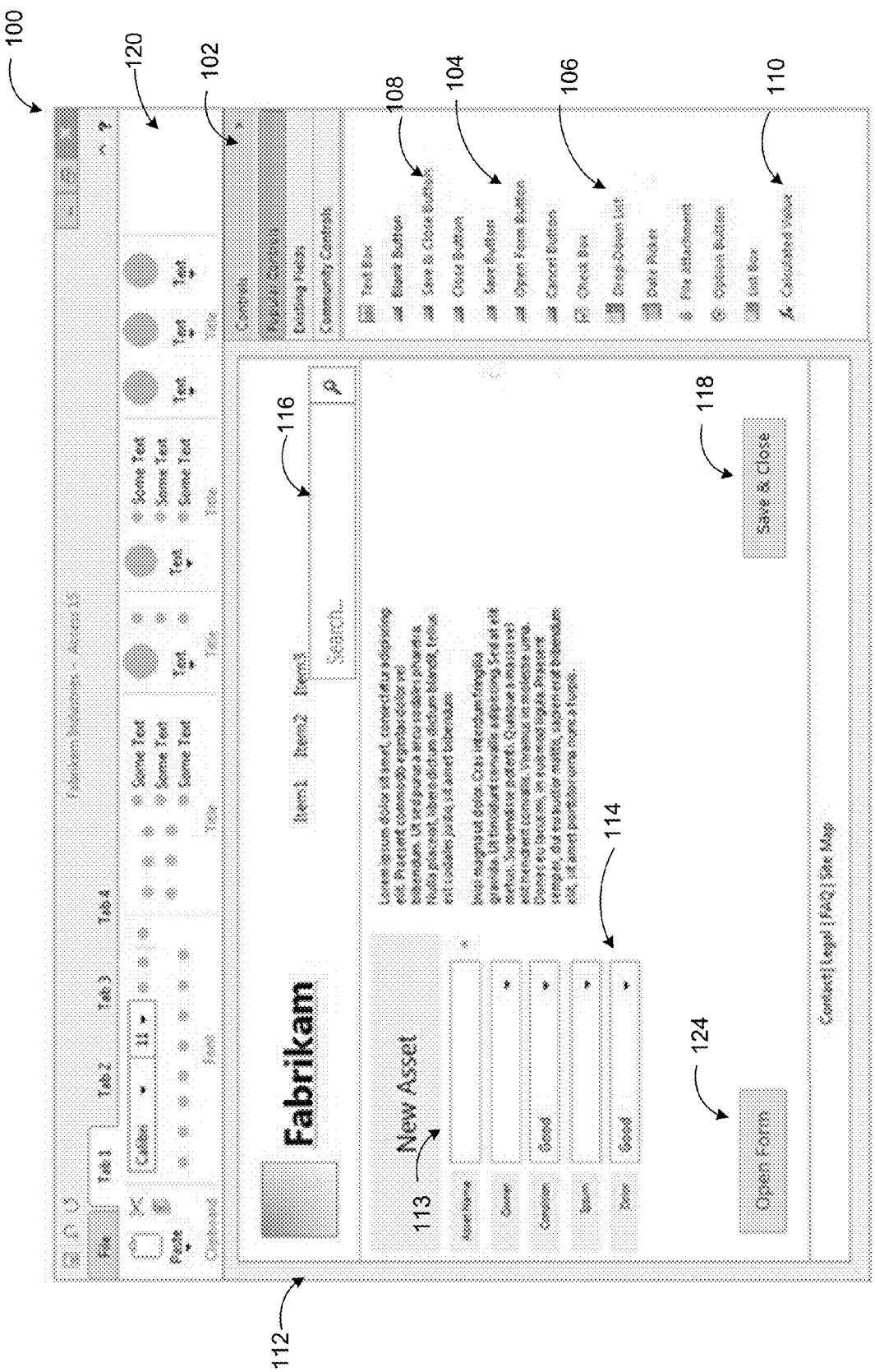
FIG. 1 illustrates an example screen shot of a solution design including a control gallery in a database program and pre-built controls inside an application.

As briefly described above, a gallery of pre-built controls in a database program may enable to a user to create a data application or solution using the pre-built controls without necessitating a user to access a code editor to build the solution. The gallery may contain commonly used controls and actions in the database program, which may be added to the application by simple drag and drop or similar actions, and the logic and code may be pre-built behind the controls such that a user may add a control to a solution and the logic behind the control may be automatically built into the solution without the user having to manually build and generate the code logic. The code built into the control can also be fully editable so that a user can easily modify a control without starting from scratch or an empty coding environment.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for building and modifying (as well as executing) database applications. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 illustrates an example screen shot of a solution design including a control gallery in a database program. As illustrated in diagram 100, a user may create a solution in a table or form, for example, in a database program using pre-built controls provided in a gallery of control objects. Users may create a variety of database applications and solutions in a database program such as tables, forms, projects, and reports. Typically building complex solutions in a database program may require a user to have some knowledge of programming languages and the ability to write and edit code and logic using a program design application. A gallery of pre-built control objects may enable users with little experience in coding or programming to build solutions in a database program without having to access a coding environment.

In a system according to embodiments, for a user to build a complete logic solution from start to finish in a database program, a user may only need to have access to the gallery of controls. The gallery may display the controls in a separate menu 102 or the controls may be incorporated into a ribbon taskbar 120 in the design view 112 of the database program. Additionally, a user may be able to customize the gallery display to determine where the controls are be displayed, how they are be displayed, any custom created logic controls and which logic scenarios are or are not be displayed in the gallery. Some users may use certain logic scenarios more than others, and the user may be able to customize the gallery view according to the user's preferences and usage in order to create an efficient gallery for use in building a complete database solution. Thus, users are allowed to create their own custom defined controls for use in the gallery.

The gallery may contain control objects for various controls and actions that account for logic scenarios in the database program. A database program may contain many logic scenarios for building a solution in the database program, and the gallery may display most or all of the commonly used controls that account for the common logic scenarios. The control objects in the gallery may be pre-built to contain the code and the logic behind each of the controls, so that a user may simply select a control for addition to the solution, and the user never needs to view or access the logic behind the control. The control objects in the gallery may clearly indicate the control or action to be executed in the solution so that the gallery is simple and intuitive for the user, and the pre-built control objects in the gallery may be added to the design view 112 of a solution for building the components into the solution.

The control objects may be labeled with text to clearly and concisely indicate the action the control object represents and/or the control objects may be displayed as icons or graphics to represent particular actions and logic scenarios in the gallery. The control objects may be added to the solution using a click and add method or a drag and drop method. Since the gallery controls may have all of the logic for the control action built in behind the controls, when the user adds a control to the solution, or drags and drops the control onto the design canvas, the code may be automatically built into the solution, without the user ever having to access a code editor. The solution code may be accessible, however, to a user for viewing and modifying if the user desires to edit the logic behind the solution at any point during the development of the solution. The logic or code behind each control and the complete solution may follow proper programming principles and language, and may include error handling and comments so that if and when a user does need to access the code for viewing or modification, the code may be easy to read, understand and edit using known programming techniques.

Some example logic scenarios that may be used in a database program may include application navigation, filtering, record navigation, sending data, updating and validating data, and custom user interface automation. Controls representing actions in these scenarios may be displayed in the gallery of control objects as textboxes 113, drop-down menus 114, buttons, combination boxes, lists, radio buttons, and/or checkboxes that can be added to the design canvas that is fully pre-built with the logic for the control. For example, a user may need to navigate a form in the database program using by opening and closing dialogs and new pages, saving, cancelling and deleting changes to an item, or searching information contained on the page or in the form. Since these are fairly common navigation controls or actions in the database program, the gallery may contain control objects for each of these actions so that a user may add these navigation capabilities to the solution.

In an example embodiment, the gallery may include controls for saving and/or closing a form or other application within the solution. A user may select the save and close button 108 and drag and drop it onto the design view 112 in the location where the user desires to button to be placed. A button 118 may then appear in the form for enabling a user to save and close the form. The logic for the action of saving and closing the form may be pre-built in conjunction with the save and close button 108 in the gallery, and when the save and close button 108 is dragged and dropped onto the design canvas by the user, the logic may be added to the complete solution logic. A comment may be included in the solution logic indicating what instructions the logic contains, such as, "This macro will save the current record and close the form."

In another example, a user may add a search pane 116 to a solution in the database program. The search box 116 may include a textbox for inputting text and a selection button for clicking to execute the search action. When the user adds the search box to the design canvas of the solution, the pre-built logic for the search control may be automatically built into solution code, and may include instructions to search the records for the text in the textbox upon the on-click event of the search button or when the user tabs out of the search box. The default logic for the search box may be to search over all of the records on the current form and/or sub-forms if a sub-form exists. Optionally, a dialog or wizard may be presented for enabling a user to set up the search box and to customize the records that are searched upon when the search button is clicked.

In some scenarios, controls to be added to the solution may contain the complete logic for executing the actions. For example, the save, close, delete, cancel, and undo buttons may be added to the solution by simply dragging and dropping onto the design canvas for the solution, without any other input. Other logic scenarios, however, may require more information or more input parameters for adding the complete logic to the solution and may be entered in a wizard or dialog once the control is added to the design surface. An example logic scenario requiring more input parameters may include an Open-Form control 104. Opening a form in a database program first requires the user selecting which form they want to open when the control is clicked. As well, opening may be executed in a variety of ways, for example, inline (in place of the existing page's contents), in a sub-form (in a form on the current page) and in a modal popup window. When a user selects the Open-Form control 104 from the gallery and drags and drops it onto the design view 112 to create an Open-Form button, the button 124 may appear and the button may say "Open Form." When it is added to the canvas a wizard or dialog may pop-up to and show the user what else they need to fill out before the control is complete and guide the user through the further input parameters.

Figure 2:
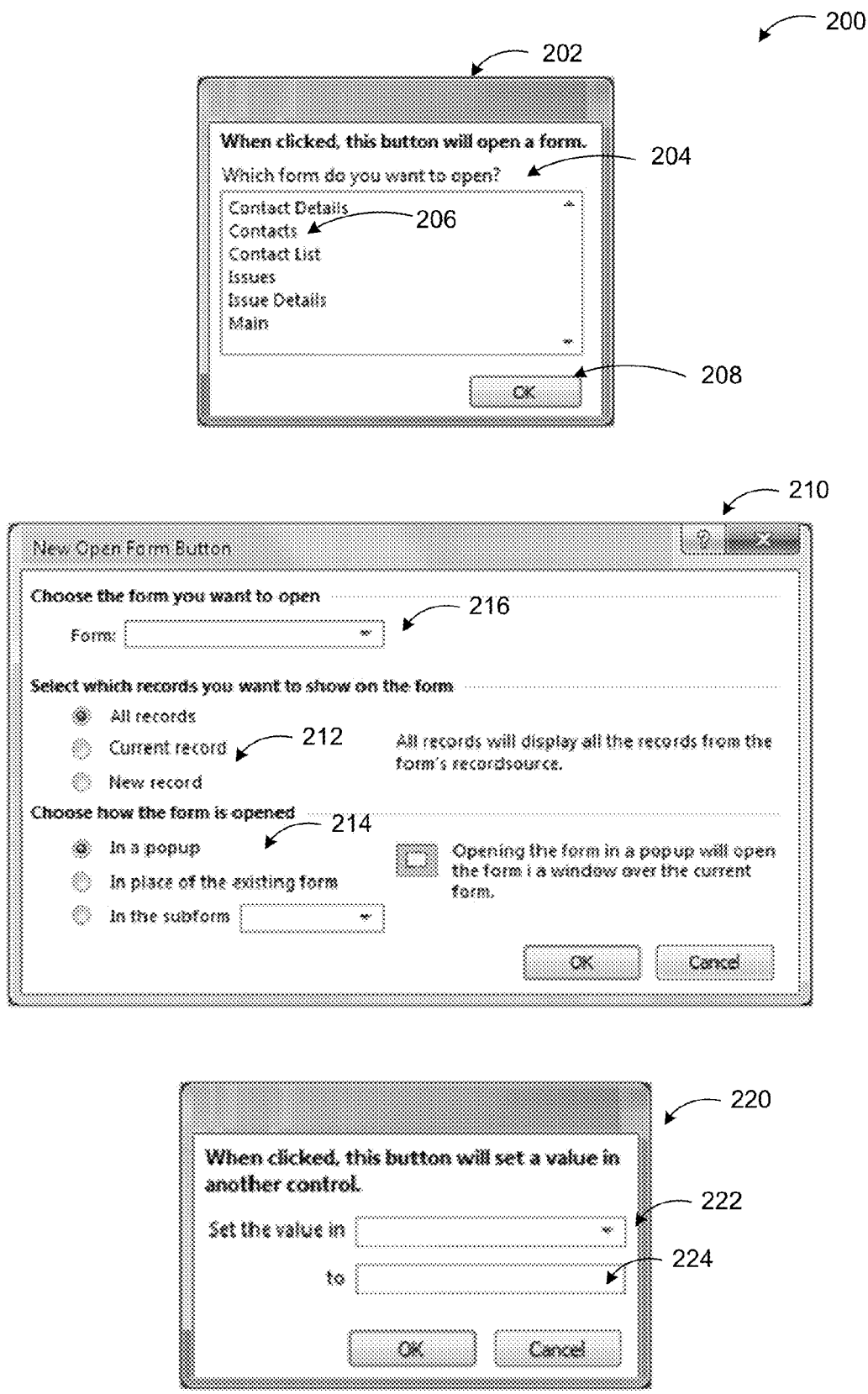
FIG. 2 illustrates example screen shots of dialogs or wizards for inputting further parameters for a logic scenario, according to embodiments.

FIG. 2 illustrates an example screen shots of dialog or wizards for inputting further parameters for a logic scenario, according to embodiments. As briefly described above in conjunction with FIG. 1, when a user adds a control to the design solution, more information may be needed to fully build the complete logic for the control into the solution. When more information is needed to build the complete logic for a control, upon addition of the control to the design canvas, a dialog or wizard may pop-up to gather more input parameters from a user. For example, when a user selects to add an Open-Form control to the solution, upon addition of the Open-Form control, the Open-Form button 124 may be created in the solution and a dialog 202 may appear prompting the user to indicate the name of the form the user wants to open (204). Users may click to select the form name, such as "Contacts" 206 for example, from the list in the dialog, and upon clicking the "ok" button 208, the dialog may close, and the complete logic for the Open-Form button may be built. Selection of the form name may also be through other means such as a drop-down menu, a checkbox selection, etc.

The control logic may be built into the solution, so that whenever the Open-Form button is selected from the design solution, the form that the user selected in the dialog is opened. Additionally, the caption for the Open-Form button may be updated and modified to display "Open Contacts," for example, if the user selected Contacts 206 from the dialog list, and the comment in the logic for the Open-Form button may indicate that the control will open the contacts form upon selection, or whichever other form the user has selected to open. A user may be able to modify the logic to change the form selected for opening or make other changes to, if needed.

In other embodiments, a further dialog 210 may be presented to gather additional information for opening a form, such as for example, which records are to be shown on the form 212 and how the form is to be opened 214. The user may first select the form to be opened from a drop-down list 216, and then further options for opening the form may be presented in checkboxes or drop-down menus or lists. In an example, opening a form in the database program may be executed in a variety of ways. For example, inline, in a sub-form, or in a pop-up window, and a checkbox dialog for selecting one of the available Open-Form methods may be used to enable a user to determine the opening method for the form. Additionally, a user may select which record(s) from the record set the form is bound to show in the form when it is opened. They may opt to view the current record, a new record, or to display all records. Other information may be gathered using checkboxes for selecting from a limited number of options or drop-down menus for displaying all options for a specified item.

In another example, a user may be enabled to set a value in another control through dialog box 220. A drop-down menu 222 may be employed for a user to select which control the user wants to set the value to. For example, the dialog may ask what control is to be set, and what value the control is to be set to. The dialog box 220 may present a drop-down menu or a list of all of the controls in the current form. Additionally, a builder button may enable a user to pop-up an expression builder to choose a control outside the current form. The drop-down menu may also list the controls on sub-forms as well, if a sub-form exists on the form the button is dragged onto. The dialog may also display a second drop-down menu or list, or textbox 224, for selecting or inputting a value for setting the control. The values to be set may be in the context of the control selected. Some example values for controls that may be selected or displayed may include an expression builder, a calendar/date picker, an attachment picker for selecting a file to attach, or a calculator. The second drop-down box may be able to parse the control type of the control being updated so as to allow the user to easily select from a list of acceptable values for the control based on the control's definition. For example, if the user selects from the drop-down menu 222 the control named "Gender", then textbox 224 may turn into a comboBox control with just the options "Male" and "Female".

Figure 3:
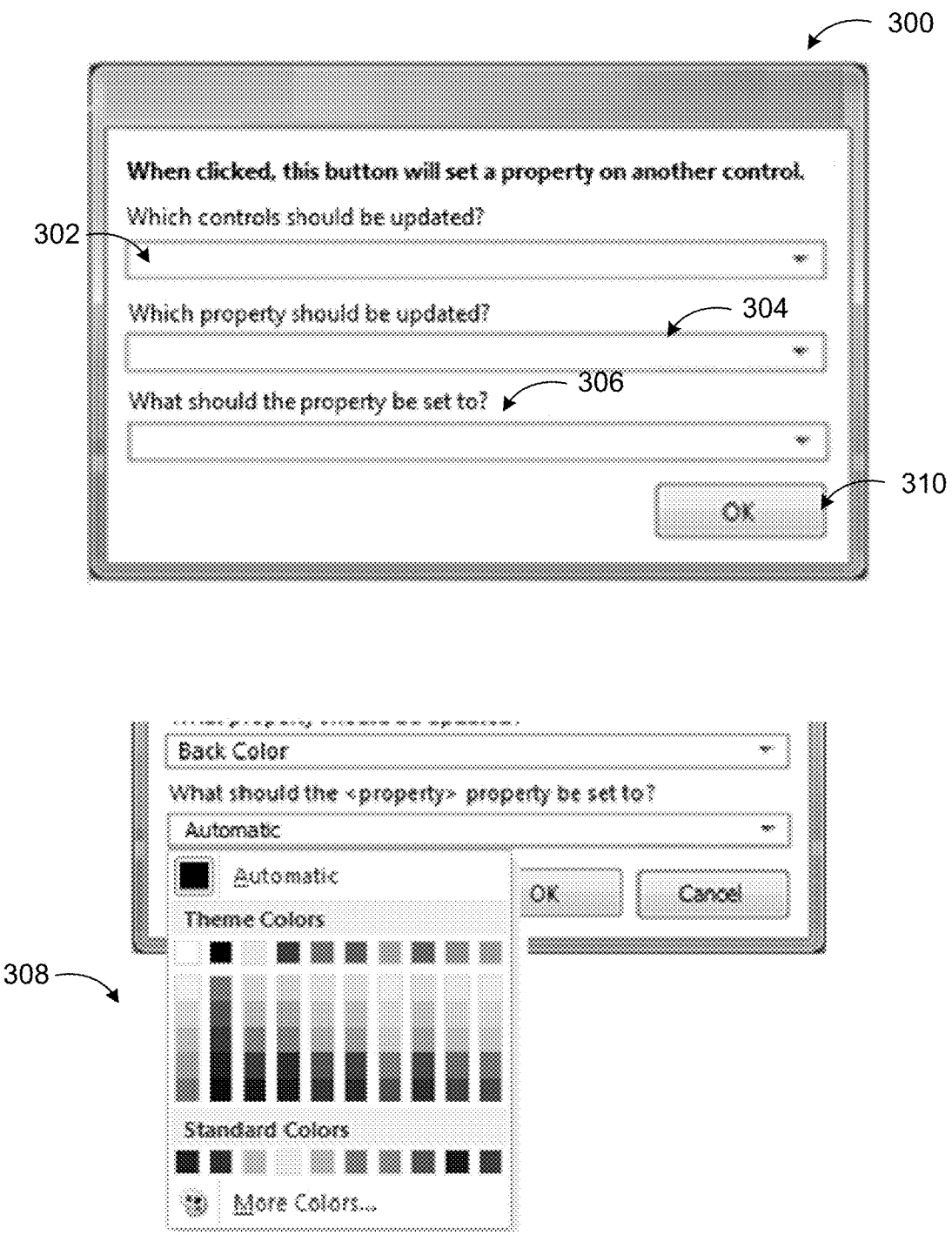
FIG. 3 illustrates an example screen shot of a dialog or wizard for inputting further parameters for a logic scenario.

FIG. 3 illustrates an example screen shot of a dialog or wizard for inputting further parameters for a logic scenario, according to embodiments. In an example embodiment, a user may select to add a "Set Property" Button, and upon adding the Set Property button, a dialog 300 may appear with several drop-down menus for the user to select further parameters for setting a property on another control. For example, some further input parameters may include, which control is to be updated (302), which property is to be updated (304), and what the property is to be set to (306). The Set Property button may set a property on a control in the current form or a sub-form. Some example properties for setting for a control may include enabled, visible, locked, color, foreground color, background color, and caption. Some example property values for the properties may be true or false for enabled/visibility, a color picker or the ability to write in hex values for color for the color property, and a textbox to choose values for captions.

For example, a color picker 308 may be displayed to allow users to easily select the color they want to update without needing to learn hex color codes or the database program color code. The drop-down menus or lists may be progressively selective, such that when a property is chosen, only property values for the selected property may be displayed in a subsequent menu. For example, the first question "which controls should be updated" (302) may show all the controls on the current form. Once a control is selected, the subsequent menu or list (e.g., 304, 306) may display a smaller list of the control properties to be updated. For instance, if a user selects a control that is a textbox, the drop-down menu may display property values such as color, enabled, visible, but may not display a caption property as textboxes do not have a separate caption property. Once all of the questions have been selected or answered by the user, the user may select "ok" and upon clicking the "ok button" 310, the code may be built into the solution.

The example systems in FIG. 1 through 3 have been described with specific configurations, applications, and interactions. Embodiments are not limited to systems according to these examples. A system for providing a gallery of pre-built controls for logic scenarios in a database program may be implemented in configurations employing fewer or additional components and performing other tasks. Furthermore, specific protocols and/or interfaces may be implemented in a similar manner using the principles described herein.

Figure 4:
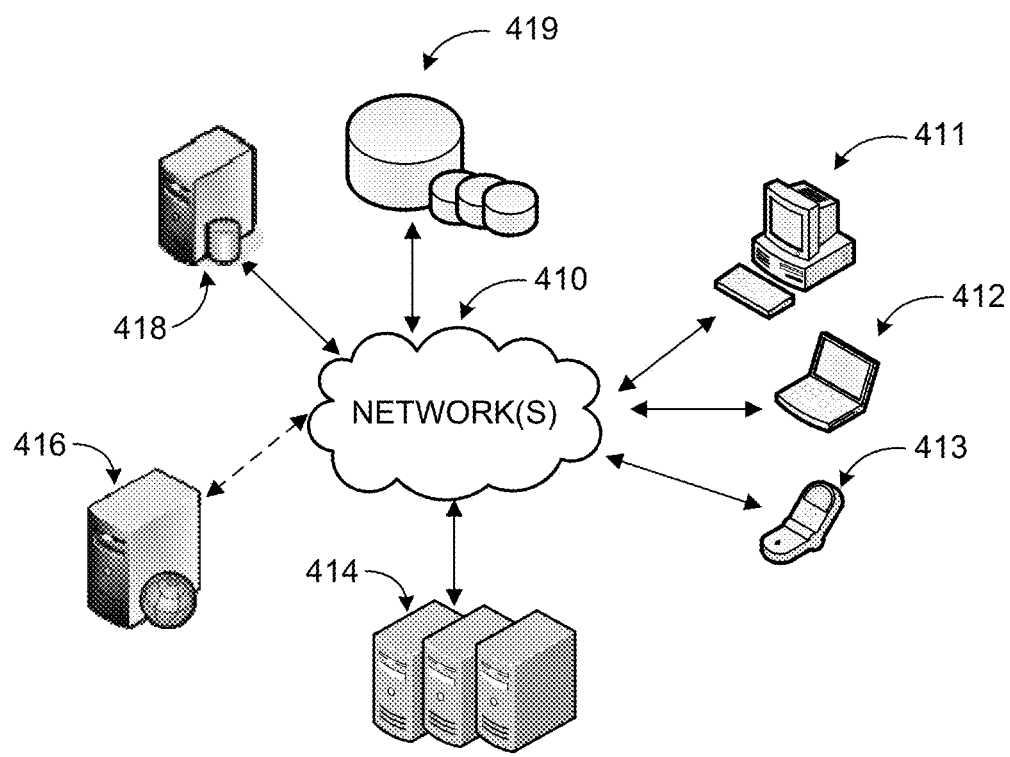
FIG. 4 is a networked environment, where a system according to embodiments may be implemented.

FIG. 4 is an example networked environment, where embodiments may be implemented. A system for providing a gallery of pre-built controls for logic scenarios in a database program may be implemented via software executed over one or more servers 414 such as a hosted service. The platform may communicate with client applications on individual computing devices such as a smart phone 413, a laptop computer 412, or desktop computer 411 ('client devices') through network(s) 410.

Client applications executed on any of the client devices 411-413 may facilitate communications via application(s) executed by servers 414, or on individual server 416. An application executed on one of the servers may facilitate generating a gallery containing pre-built controls for the main logic scenarios used in a database program, adding the controls to a design solution and building the logic for the controls into the complete solution code logic. The application may provide additional dialogs or wizards to a user for the selection of further input parameters for building a complete logic solution according to the user's custom preferences. The application may retrieve relevant data from data store(s) 419 directly or through database server 418, and provide requested services (e.g. document editing) to the user(s) through client devices 411-413.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a platform providing a gallery of pre-built controls for logic scenarios in a database program. Furthermore, the networked environments discussed in FIG. 4 are for illustration purposes only. Embodiments are not limited to the example applications, modules, or processes.

Figure 5:
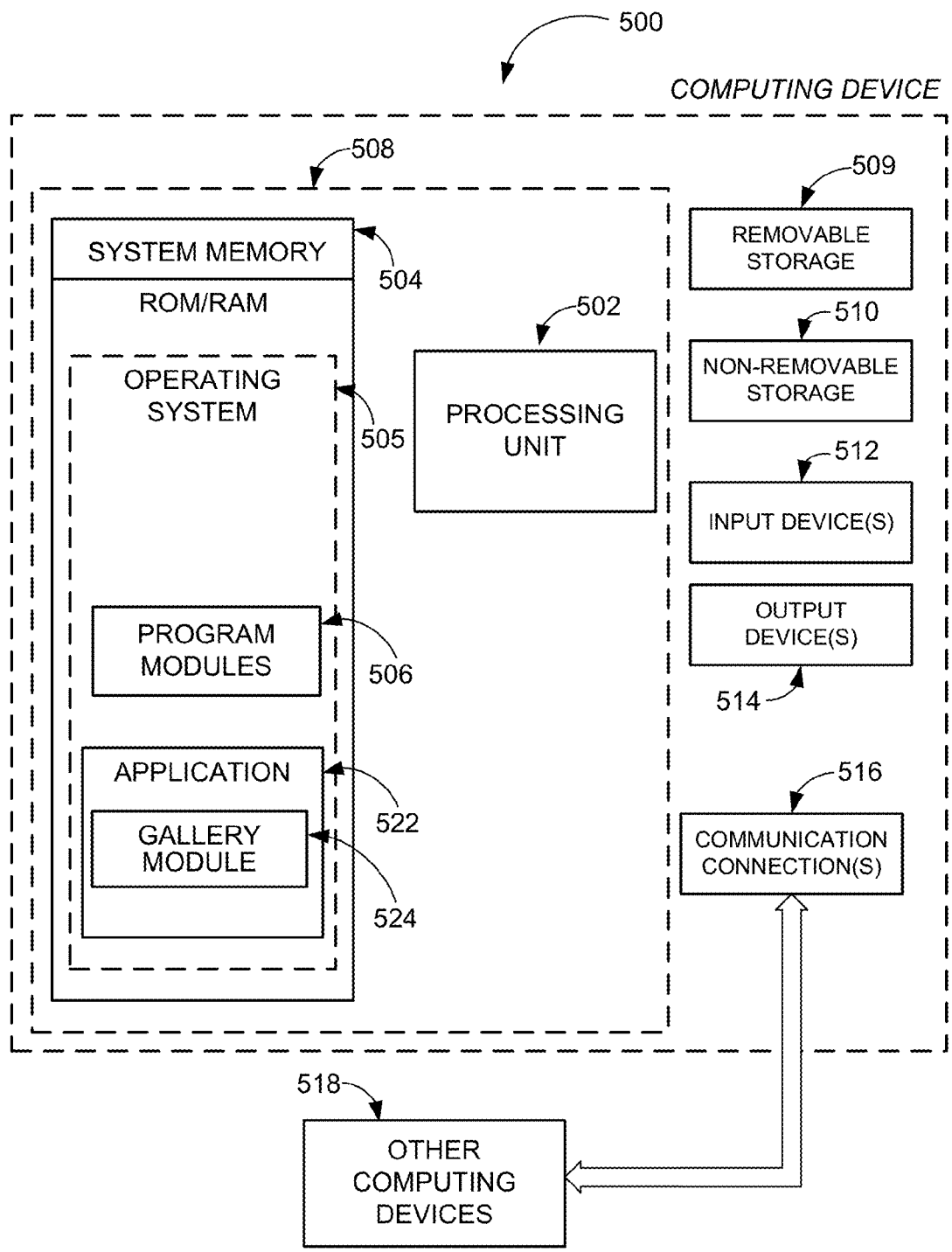
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any computing device executing an application for providing a gallery of pre-built controls for logic scenarios in a database program according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, application 522, and gallery module 524.

Application 522 may enable a computing device 500 to provide a gallery of pre-built controls for the main logic scenarios in the design view of a database program and enable a user to select controls from the gallery to add to a solution in the database program, building the control logic into the complete solution code. Through a user interface controlled by gallery module 524, application 522 may display the commonly used controls or actions in a database program as pre-built controls in a gallery contained in the design view of the database program. The application may enable a user to drag and drop a pre-built control onto the design surface for a solution, and the application may build the logic behind the control into the complete solution code logic. The application may further display wizards for inputting additional information needed to build the complete logic for a control into the solution code. The application may allow for the user to create and specify their own custom built controls. Application 522 and gallery module 524 may be separate applications or integrated modules of a hosted service. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, web servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
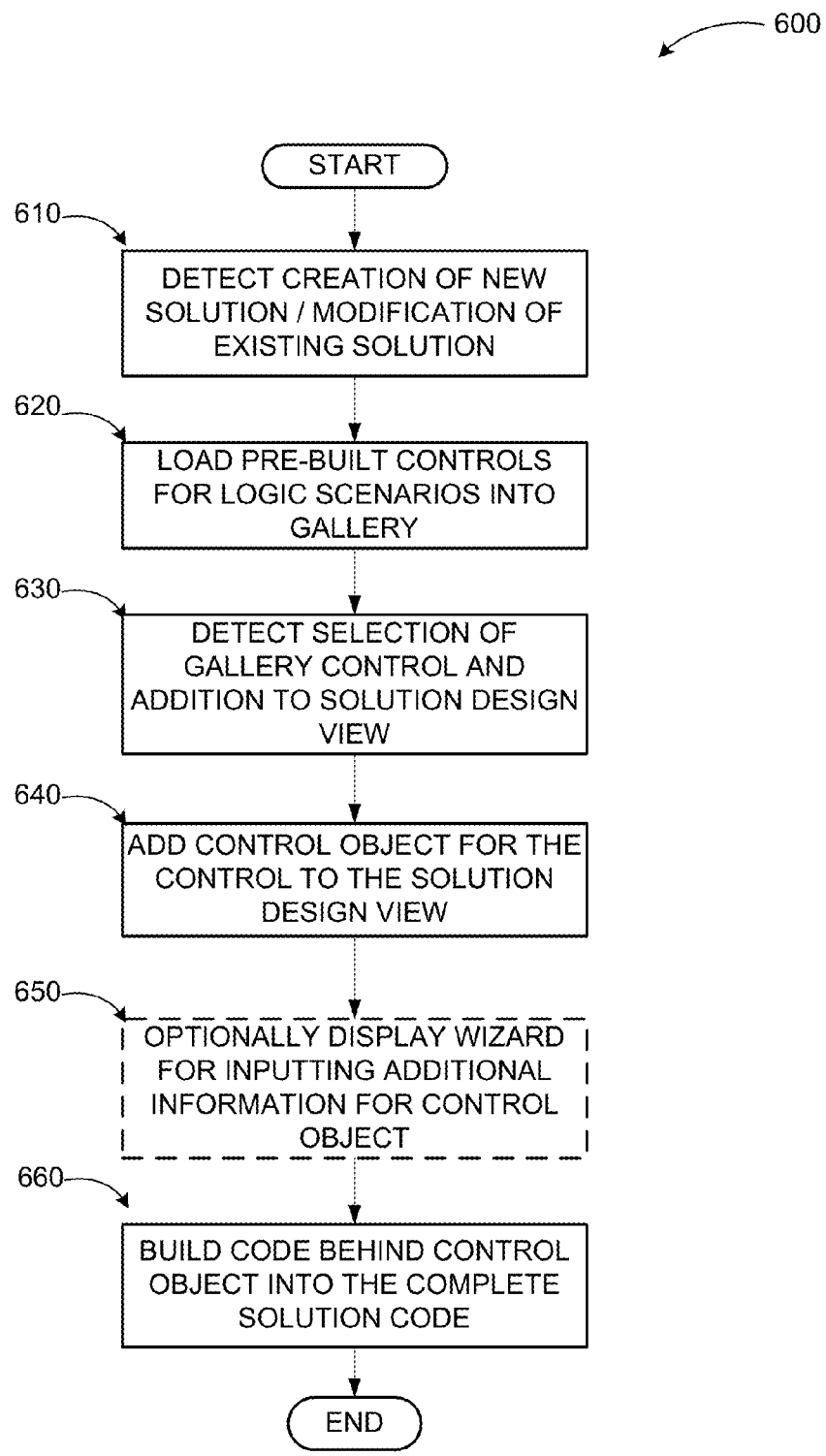
FIG. 6 illustrates a logic flow diagram for a process of providing a gallery of pre-built controls for logic scenarios in a database program according to embodiments.

FIG. 6 illustrates a logic flow diagram for process 600 of providing a gallery of pre-built controls for logic scenarios in a database program according to embodiments. Process 600 may be implemented on a computing device or similar electronic device capable of executing instructions through a processor.

Process 600 begins with operation 610, where the system may detect that a user has created or opened a new design solution in a database program. Alternatively, the user may be modifying an existing design solution. Some example solutions in a database program may include forms, tables, projects, queries, and reports. Upon detection of the creation of a new solution or modification of the existing solution, the system may determine commonly used logic scenarios for the type of solution that the user is working on. At operation 620, the system may load pre-built controls for actions or objects representing the commonly used logic scenarios into a gallery of control objects. The gallery of control objects may be displayed as a menu in the design view of the solution in the database program, or the controls may be displayed as part of a task bar displayed as part of the solution design view. The gallery may enable a user to select a control in the gallery for addition to the solution. A user may click on a control to select it, or the user may use a drag and drop method to add the control to the solution. The controls in the gallery may contain the logic or code for generating the control pre-built behind the control, such that a user may simply select to add the control to the solution without having to edit any code or access a code editor.

At operation 630, the system may detect the selection of a control from the gallery and the addition of the control to the solution design view, using a click and add method, a drag and drop method, or a comparable one. Upon addition of the control to the solution, at operation 640 the system may add the object for the control to the design solution. The object may be a button, menu, list, textbox, or pop-up window for some examples. Additionally, the logic behind the control may be added to the complete solution code. This may allow for the code of the solution to be up-to-date with the components of the solution that a user has added, without the user having to edit the solution code manually.

In some logic scenarios or controls, more information may be needed to build the complete logic for the control into the system. In such cases, the system may optionally display a wizard or a dialog window at operation 650, which may appear after the addition of a control to the solution design view. The wizard may present multiple questions, drop-down menus, lists, or checkboxes for displaying additional input parameters and options for a user to select to customize and complete the control object in the solution. After the user has selected the additional options and provided the needed further information for building the complete logic for the control in the solution, the system may update the object in the solution to display the exact function or operation of the object in the solution. At operation 660 the complete logic for the control object may be built into the solution code logic for the solution in the database program.

The code may be available to a user for editing and customizing if a user desires, however, the complete solution may be built from start to finish without the user having to access a code generator or produce any code or logic. In some embodiments, the solution may be logic inside of a table, a form, a project, a report, or a query.

The operations included in process 600 are for illustration purposes. Creating logic using pre-built controls may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for providing a gallery of control objects, the method comprising:
   detecting one of creation of a new solution and modification of an existing solution for a database program;
   determining commonly used logic scenarios for solutions in the database program;
   generating a gallery of control objects with pre-built logic for the commonly used logic scenarios in projects in the database program;
   enabling a user to select and add a control object from the gallery to a solution design canvas;
   displaying the newly added control object on the solution design canvas;
   upon addition of the control object to the solution design canvas, presenting a dialog for inputting additional parameters to build the logic behind the control object into logic code for the solution, wherein the dialog includes a menu and/or a list of controls in a current form and controls in a sub-form, if the sub-form exists on the current form;
   presenting through the dialog another menu and/or list for selecting or inputting a value for setting the control object, wherein the values are in a context of the control object selected by the user;
   parsing a type of the control object at the dialog to allow the user to easily select from a list of acceptable values for the control object based on a definition of the control object;
   automatically building the logic behind the control object into a logic code for the solution; and
   executing one or more actions represented by the control object upon activation of the control object.

2. The method of claim 1, further comprising:
   enabling the logic behind the control object to be fully editable for future use; and
   allowing the user to create their own custom defined controls for use in the gallery.

3. The method of claim 1, wherein the solution is logic inside of one of a table, a form, a project, a report, and a query.

4. The method of claim 1, wherein the dialog includes one or more of: a drop-down menu, a checkbox, a list, and a textbox for inputting additional information.

5. The method of claim 1, further comprising:
upon detecting the requested information having been inputted through the dialog, enabling the user to close the dialog; and
updating one or more of: the code behind the control object, a comment for the logic behind the control object describing a control action, a caption on the control object on the solution design canvas, and the control object displayed on the solution design canvas.

6. The method of claim 1, further comprising:
displaying the gallery of control objects as one of a separate menu and as part of taskbar within the solution design canvas.

7. The method of claim 1, further comprising:
labeling the control object in the gallery to indicate at least one of an action and a logic scenario represented by each control object.

8. The method of claim 1, wherein enabling a user to add a selected control object to the solution design canvas, further comprises:
enabling the user to select the control object in the gallery, drag the control object from the gallery to the solution design canvas, and drop the control object onto the solution design canvas for addition to the solution at a location where the control object is dropped.

9. The method of claim 1, wherein the control object is one of: a button, a textbox, a combination box, a search box, a radio button, a caption box, a checkbox, a drop-down menu, and a list.

10. The method of claim 1, wherein the logic scenarios include actions and controls for one or more of: an application navigation, a database filtering, a record navigation, a data update and validation, a data sending and receiving, and a custom user interface automation.

11. A computing device for providing a gallery of control objects in conjunction with a database program, the computing device comprising:
a memory storing instructions;
a processor coupled to the memory, the processor executing a solution design application for providing a gallery of control objects, wherein the solution design application is configured to:
detect one of creation of a new solution and modification of an existing solution for a database program;
determine commonly used logic scenarios for solutions in the database program;
generate a gallery of control objects with pre-built logic for the commonly used logic scenarios in projects in the database program;
enable a user to select and add a control object from the gallery to a solution design canvas;
display the newly added control object on the solution design canvas;
upon addition of the control object to the solution design canvas, present a dialog for inputting additional parameters to build the logic behind the control object into logic code for the solution, wherein the dialog includes a menu and/or a list of controls in a current form and controls in a sub-form, if the sub-form exists on the current form, and is progressively selective such that when a property is selected, only values for the selected property are displayed in another menu and/or list;
present the other menu and/or list for selecting or inputting a value for setting the control object, wherein the values are in a context of the control object selected by the user;
parse a type of the control object at the dialog to allow the user to easily select from a list of acceptable values for the control object based on a definition of the control object;
automatically build the logic behind the control object into a logic code for the solution;
automatically update a comment for the logic behind the control object describing a control action, a caption on the control object on the solution design canvas, and the control object displayed on the solution design canvas;
enable the logic behind the control object to be fully editable for future use;
allow the user to create their own custom defined controls for use in the gallery; and
execute one or more actions represented by the control object upon activation of the control object.

12. The computing device of claim 11, wherein one of the logic and the code behind the control object complies with predefined programming principles and language, and includes error handling and comments.

13. The computing device of claim 11, wherein the the dialog comprises one or more of: a drop-down menu, a checkbox, a list, and a textbox for inputting additional information upon the addition of a control object which requires more parameters for building the logic for the control object.

14. The computing device of claim 11, wherein the solution design application is further configured to enable a user to select a set of records to which the added control object is applicable to.

15. The computing device of claim 11, wherein the solution design application is further configured to display the gallery of control objects as one of a separate menu and as part of taskbar within the solution design canvas and label the control object in the gallery to indicate at least one of an action and a logic scenario represented by each control object.

16. The computing device of claim 11, wherein the solution design application is further configured to enable a user to customize the gallery of control objects to display controls according to at least one of a user preference and a frequency of usage.

17. A computer-readable memory device with instructions stored thereon for providing a gallery of control objects in conjunction with a database program, the instructions comprising:
detecting one of creation of a new solution and modification of an existing solution for a database program;
determining commonly used logic scenarios for solutions in the database program;
generating a gallery of control objects with pre-built logic for the commonly used logic scenarios in projects in the database program;
enabling a user to select and add a control object from the gallery to a solution design canvas;
displaying the newly added control object on the solution design canvas;
if the control object requires custom parameters, presenting a dialog for inputting custom parameters to build the logic behind the control object into logic code for the solution, wherein the dialog includes a menu and/or list of controls in a current form and controls in a sub-form, if the sub-form exists on the current form, and is progressively selective such that when a property is selected, only values for the selected property are displayed in another menu and/or list;

presenting the other menu and/or list for selecting or inputting a value for setting the control object, wherein the values are in a context of the control object selected by the user;

parsing a type of the control object at the dialog to allow the user to easily select from a list of acceptable values for the control object based on a definition of the control object;

automatically building the logic behind the control object into a logic code for the solution and making it available for future modifications;

automatically updating a comment for the logic behind the control object describing a control action, a caption on the control object on the solution design canvas, and the control object displayed on the solution design canvas;

enabling the logic behind the control object to be fully editable for future use;

allowing the user to create their own custom defined controls for use in the gallery; and executing one or more actions represented by the control object upon activation of the control object.

18. The computer-readable memory device of claim 17, wherein the instructions further comprise:

upon demand, activating a code editor for enabling a user to review and modify the code behind the control object and the solution code.

19. The computer-readable memory device of claim 17, wherein the user is enabled to select and add the control object from the gallery to the solution design canvas through one of a click-and-add method and a drag-and-drop method, and wherein the dialog includes at least one set of drop-down menus and lists that are progressively selectable.

* * * * *